(12) United States Patent
Morimoto et al.

(10) Patent No.: US 11,262,624 B2
(45) Date of Patent: Mar. 1, 2022

(54) LIQUID CRYSTAL DISPLAY DEVICE

(71) Applicant: Japan Display Inc., Tokyo (JP)

(72) Inventors: Masateru Morimoto, Tokyo (JP); Saori Sugiyama, Tokyo (JP); Motoharu Miyamoto, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 16/909,255

(22) Filed: Jun. 23, 2020

(65) Prior Publication Data

US 2020/0319492 A1 Oct. 8, 2020

Related U.S. Application Data

(63) Continuation of application No. 15/916,625, filed on Mar. 9, 2018, now Pat. No. 10,725,345, which is a continuation of application No. 15/040,671, filed on Feb. 10, 2016, now abandoned.

(30) Foreign Application Priority Data

Feb. 13, 2015 (JP) ................................. 2015-026406

(51) Int. Cl.
*G02F 1/1339* (2006.01)
*G02F 1/1362* (2006.01)
*G02F 1/1343* (2006.01)

(52) U.S. Cl.
CPC .... *G02F 1/13394* (2013.01); *G02F 1/136286* (2013.01); *G02F 1/134372* (2021.01)

(58) Field of Classification Search
CPC ........... G02F 1/13394; G02F 1/136286; G02F 1/134372; G02F 1/13629; G02F 1/136295; G02F 1/133512; H01L 27/3276; H01L 27/3279; H01L 27/3297
See application file for complete search history.

(56) References Cited

U.S. PATENT DOCUMENTS

| 2009/0032818 A1* | 2/2009 | Kim ..................... H01L 27/1288 257/59 |
| 2014/0118666 A1* | 5/2014 | Lee ..................... G02F 1/13394 349/106 |
| 2015/0062451 A1* | 3/2015 | Ono ..................... G06F 3/0412 349/12 |

* cited by examiner

*Primary Examiner* — Angela K Davison
(74) *Attorney, Agent, or Firm* — Michael Best & Friedrich LLP

(57) ABSTRACT

The displacement between a TFT substrate and a counter substrate and the cut of an alignment film caused by a columnar spacer are prevented. A liquid crystal display device includes: a TFT substrate including a scanning line extending in a first direction, a picture signal line extending in a second direction, a pixel electrode formed in a region surrounded by the scanning line and the picture signal line, and a common electrode formed as opposed to the pixel electrode through an insulating film; a counter substrate disposed as opposed to the TFT substrate and having a spacer; and a liquid crystal sandwiched between the substrates. A common metal interconnection is formed to cover the picture signal line or the scanning line, and stacked on the common electrode. A through hole is formed on the common metal interconnection. The tip end of the spacer is disposed inside the through hole.

8 Claims, 20 Drawing Sheets

LIQUID CRYSTAL DISPLAY DEVICE

CROSS-REFERENCE TO RELATED APPLICATIONS

This application is a continuation of U.S. patent application Ser. No. 15/916,625, filed on Mar. 9, 2018, which, in turn, is a continuation of U.S. patent application Ser. No. 15/040,671, filed on Feb. 10, 2016. Further, this application claims priority from Japanese Patent Application JP 2015-26406 filed on Feb. 13, 2015, the entire contents of which are hereby incorporated by reference into this application.

BACKGROUND OF THE INVENTION

(1) Field of the Invention

The present invention relates to a liquid crystal display device, and to a high contrast liquid crystal display device that prevents light leakage specifically in black display.

(2) Description of the Related Art

A liquid crystal display device has a liquid crystal display panel including a TFT substrate, a counter substrate disposed as opposed to the TFT substrate, and a liquid crystal sandwiched between the TFT substrate and the counter substrate. The TFT substrate includes pixels in a matrix configuration, each of which has a pixel electrode, a thin film transistor (TFT), and other components. The light transmittance of liquid crystal molecules is controlled for each pixel to form images.

In the liquid crystal display device, in order to maintain the gap between the TFT substrate and the counter substrate, columnar spacers are formed on one of the substrates. On a high definition liquid crystal display device, it becomes difficult to form columnar spacers corresponding to all pixels. Japanese Unexamined Patent Application Publication No. 2006-23458 describes a configuration in which a projection is disposed on a pixel having no columnar spacer and thus the initial alignment of liquid crystal molecules is made uniform.

SUMMARY OF THE INVENTION

Columnar spacers are provided on the counter substrate in order to maintain the gap between the TFT substrate and the counter substrate. In this case, in pressing the counter substrate with a finger, for example, the locations of the columnar spacers are displaced, causing a phenomenon at this time, in which the columnar spacers cut an alignment film on the TFT substrate. When the alignment film is chipped or lost, light leaks from the chipped or lost region of the alignment film, causing a bright spot.

On the other hand, alignment films are used for the initial alignment of liquid crystal molecules. However, when the alignment axis of the alignment film is different from the orientation of a picture signal line, for example, the polarization direction of light reflected off the side surface of the picture signal line is changed. This reflected light is not blocked enough. Consequently, contrast is decreased.

The present invention is to solve and overcome the problems.

The following is specific aspects of the present invention.

(1) A first aspect of the present invention is a liquid crystal display device including: a TFT substrate having a scanning line extending in a first direction and arrayed in a second direction, a picture signal line extending in the second direction and arrayed in the first direction, a pixel electrode formed in a region surrounded by the scanning line and the picture signal line, and a common electrode formed as opposed to the pixel electrode through an insulating film; a counter substrate disposed as opposed to the TFT substrate and having a columnar spacer; and a liquid crystal sandwiched between the TFT substrate and the counter substrate. In the liquid crystal display device, a common metal interconnection is formed to cover the picture signal line or the scanning line, and the common metal interconnection is stacked on the common electrode. A through hole is formed on the common metal interconnection. A tip end of the columnar spacer is disposed inside the through hole.

(2) A second aspect is a liquid crystal display device including: a TFT substrate including a scanning line extending in a first direction and arrayed in a second direction, a picture signal line extending in the second direction and arrayed in the first direction, a pixel electrode formed in a region surrounded by the scanning line and the picture signal line, and a common electrode formed as opposed to the pixel electrode through a first insulating film; a counter substrate disposed as opposed to the TFT substrate and having a columnar spacer; and a liquid crystal sandwiched between the TFT substrate and the counter substrate. In the liquid crystal display device, the pixel electrode, the first insulating film, and the common electrode are formed on a second insulating film. A contact hole for connecting the pixel electrode to a TFT is formed on the second insulating film. A common metal interconnection is formed to cover the picture signal line or the scanning line, and the common metal interconnection is stacked on the common electrode. A through hole is formed on the common metal interconnection. The columnar spacer is disposed inside the through hole. Near a region in which the contact hole is formed, the common metal interconnection covering the picture signal line is formed on every other picture signal line in the first direction.

(3) A third aspect is a liquid crystal display device including: a TFT substrate including a scanning line extending in a first direction and arrayed in a second direction, a picture signal line extending in the second direction and arrayed in the first direction, a pixel electrode formed in a region surrounded by the scanning line and the picture signal line, and a common electrode formed as opposed to the pixel electrode through an insulating film; a counter substrate disposed as opposed to the TFT substrate and having a columnar spacer; and a liquid crystal sandwiched between the TFT substrate and the counter substrate. In the liquid crystal display device, an extending direction of the picture signal line forms a predetermined angle with an initial alignment direction of liquid crystal molecules. A common metal interconnection is formed to cover the picture signal line, and the common metal interconnection is stacked on the common electrode. A width of the common electrode is wider than a width of the picture signal line. A thickness of the picture signal line is greater than a thickness of the common electrode.

DETAILED DESCRIPTION OF THE PREFERRED EMBODIMENTS

Liquid crystal display devices have problems of viewing angles. In liquid crystal display devices in IPS (In Plane Switching) modes, liquid crystal molecules are rotated to control transmittances. The devices in the IPS modes have excellent viewing angle characteristics. There are various IPS modes. For example, in a liquid crystal display device in a present mainstream IPS mode, a common electrode is formed flat. An insulating film is disposed on the common electrode. A comb teeth shaped (line shaped) pixel electrode is disposed on the insulating film. Liquid crystal molecules are aligned (rotated) using an electric field generated between the pixel electrode and the common electrode. In the device in the IPS mode, transmittances can be relatively increased. A configuration is also possible in which the pixel electrode is formed flat and the common electrode is a line shaped electrode.

Figure 1:
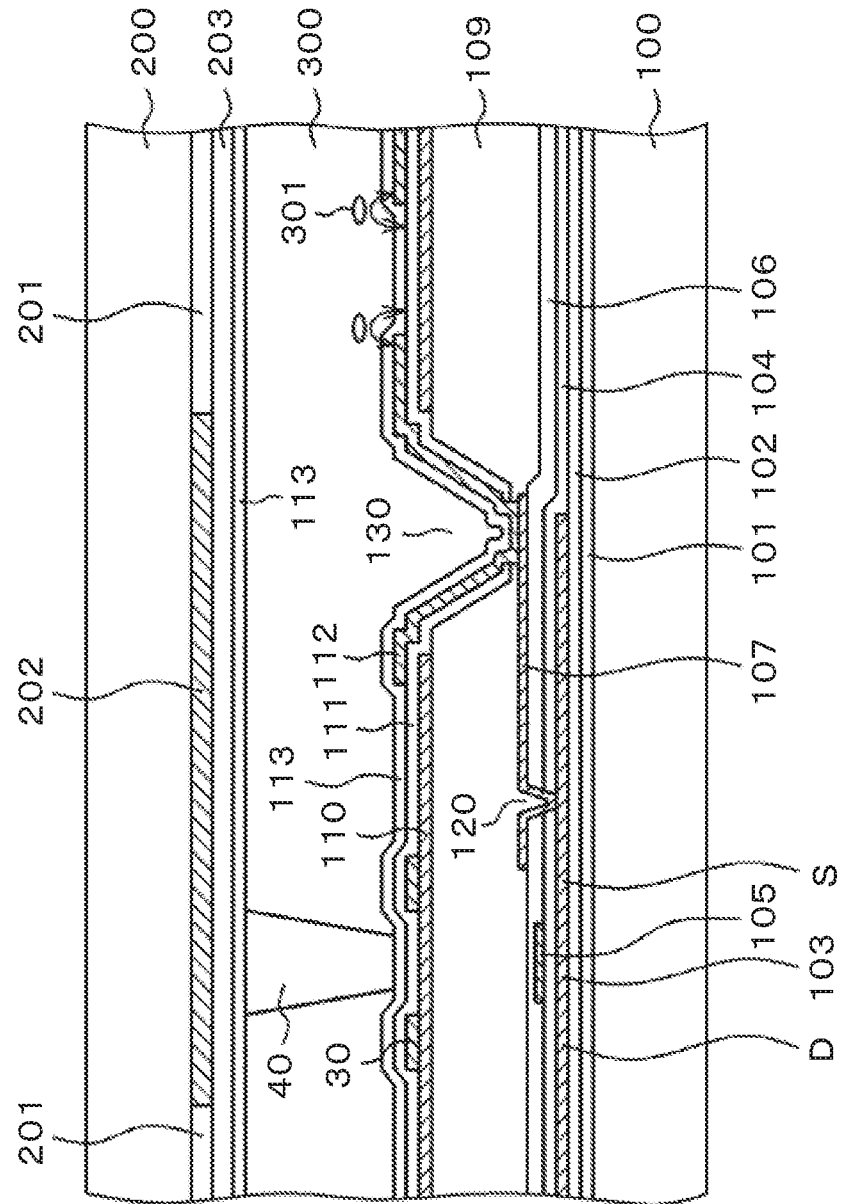
FIG. 1 is a cross sectional view of a liquid crystal display device to which an embodiment of the present invention is applied.

FIG. 1 is a cross sectional view of a liquid crystal display panel in such an IPS mode according to an embodiment. A TFT (a thin film transistor) in FIG. 1 is a so-called top gate TFT, using low temperature poly-silicon (LTPS) for a semiconductor. On the other hand, in the case in which an amorphous silicon (a-Si) semiconductor or some of LTPS is used, a so-called bottom gate TFT is often used. In the following description, an example of using a top gate TFT is taken and described. The embodiment of the present invention is also applicable to the case of using a bottom gate TFT.

In FIG. 1, on a TFT substrate 100 made of glass or a resin, for example, a first base film 101 made of silicon nitride and a second base film 102 made of silicon oxide ($SiO_2$) are formed by chemical vapor deposition (CVD). The first base film 101 and the second base film 102 are responsible for preventing a semiconductor layer 103 from being contaminated by impurities derived from the TFT substrate 100.

On the second base film 102, the semiconductor layer 103 is formed. An a-Si film is formed on the second base film 102 by CVD. This a-Si film is converted into a polysilicon (poly-Si) film by laser annealing. This poly-Si film is patterned by photolithography to form an island-like semiconductor film. Consequently, the semiconductor layer 103 is formed.

On the semiconductor film 103, a gate insulating film 104 is formed. This gate insulating film 104 is a silicon oxide film made of tetraethoxysilane (TEOS). This film is also formed by CVD. On the gate insulating film 104, a gate electrode 105 is formed. A scanning line 10 also functions as the gate electrode 105. For example, the gate electrode 105 is made of a refractory metal such as a molybdenum tungsten (MoW) film or an alloy of refractory metals. In the case in which it is necessary to decrease the resistance of the gate electrode 105 or the scanning line 10, a stacked film formed of a low resistance metal such as aluminum (Al) and copper (Cu) and a refractory metal is used.

After that, an interlayer insulating film 106 is formed of silicon nitride and silicon oxide to cover the gate electrode 105. The interlayer insulating film 106 is responsible for insulating the gate electrode 105 from a contact electrode 107. On the interlayer insulating film 106 and the gate insulating film 104, a contact hole 120 is formed to connect a source S of the semiconductor layer 103 to the contact electrode 107. The contact hole 120 is formed on the interlayer insulating film 106 and the gate insulating film 104 by photolithography at the same time.

On the interlayer insulating film 106, the contact electrode 107 is formed. The contact electrode 107 is connected to a pixel electrode 112 through a contact hole 130. A drain D of the TFT is connected to a picture signal line 20 through the contact hole.

The contact electrode 107 and the picture signal line 20 are formed on the same layer at the same time. Al or an Al alloy, for example, is used for the contact electrode 107 and the picture signal line 20 for decreasing their resistance. Al or an Al alloy causes hillocks, or Al is diffused to other layers. Thus, for example, a structure is provided in which Al or an Al alloy is sandwiched between a barrier layer made of a refractory metal such as Ti and Mo, not illustrated, and a cap layer. In some portions of the picture signal line 20, a portion connected to the drain D is sometimes referred to as a drain electrode and a portion connected to the contact electrode 107 is sometimes referred to as a source electrode. The source and drain of the TFT are appropriately switched depending on a voltage applied to the TFT.

An organic passivation film 109 is formed to cover the contact electrode 107. The organic passivation film 109 is formed of a photosensitive acrylic resin. The organic passivation film 109 can be formed of a silicone resin, epoxy resin, and polyimide resin, for example, in addition to an acrylic resin. Since the organic passivation film 109 functions as a planarization film, the organic passivation film 109 is formed thick. The film thickness of the organic passivation film 109 ranges from 1 to 4 µm. In many cases, the film thickness is about 2 to 3 µm. An inorganic passivation film may be provided between the organic passivation film 109 and the contact electrode 107.

For conduction of electricity from the pixel electrode 112 to the contact electrode 107, the contact hole 130 is formed on the organic passivation film 109. The organic passivation film 109 is made of a photosensitive resin. Consequently, after a photosensitive resin is coated, this resin is exposed to light, and then only portions exposed to light are dissolved with a specific developer. In other words, the use of a photosensitive resin can omit the formation of a photoresist. The contact hole 130 is formed on the photosensitive resin, the photosensitive resin is baked at a temperature of about 230° C., and then the organic passivation film 109 is completed.

After that, indium tin oxide (ITO) to be a common electrode 110 is formed by sputtering. ITO is patterned in such a manner that ITO is removed from the contact hole 130 and regions around the contact hole 130. The common electrode 110 can be formed flat in common to the pixels. After the common electrode 110 is formed, silicon nitride to be a capacitive insulating film 111 is formed on throughout the surface by CVD. After the capacitive insulating film 111 is formed, in the contact hole 130, a contact hole for conducting electricity from the contact electrode 107 to the pixel electrode 112 is formed on the capacitive insulating film 111.

After the contact hole is formed, ITO is formed by sputtering, and then patterned to form the pixel electrode 112. On the pixel electrode 112, an alignment film material is coated by a method such as flexographic printing or ink jet, and then baked to from an alignment film 113. For the alignment process of the alignment film 113, photo-alignment by polarized ultraviolet rays is used, in addition to rubbing.

Upon applying a voltage across the pixel electrode 112 and the common electrode 110, electric flux lines as illustrated in FIG. 1 are generated. These electric fields rotate liquid crystal molecules 301, the quantity of light transmitted through a liquid crystal layer 300 is controlled for each pixel, and then images are formed.

In FIG. 1, the counter substrate 200 is disposed on the opposite side of the liquid crystal layer 300. On the surface of the counter substrate 200 facing the liquid crystal layer, color filters 201 are formed. The color filter 201 includes red, green, and blue color filters formed for each pixel. Thus, color images are formed. Between the color filters 201, a light shielding film (a black matrix) 202 is formed to improve the contrast of images. The light shielding film 202 is also responsible for shielding TFTs from light to prevent a photocurrent from being carried through the TFTs.

An overcoat film 203 is formed to cover the color filter 201 and the black matrix 202. The color filter 201 and the black matrix 202 have uneven surfaces. Thus, the overcoat film 203 flattens the surfaces. On the overcoat film 203 (on the liquid crystal layer 300 side), an alignment film 113 is formed to determine the initial alignment of liquid crystal molecules. For the alignment process of the alignment film 113, rubbing or photo-alignment is used similarly to the alignment film 113 of the TFT substrate 100.

The gap between the TFT substrate 100 and the counter substrate 200 is defined by columnar spacers 40. The columnar spacer 40 is formed after the overcoat film 203 is formed on the counter substrate 200, or the columnar spacer 40 is formed simultaneously when the overcoat film 203 is formed. The shape of the columnar spacer 40 includes various shapes such as a columnar shape, spindle shape, and shapes in combination of columnar and spindle shapes. The feature of the embodiment of the present invention is a configuration in which the tip end of the columnar spacer 40 makes contact on the TFT substrate 100. Since the common electrode 110 of the TFT substrate 100 is formed of ITO, its resistance value is large. In order to decrease the resistance of the common electrode 110, a common metal interconnection 30 is formed between the common electrode 110 and the TFT substrate or between the common electrode 110 and the liquid crystal layer 300 above the scanning line 10 and the picture signal line 20.

In the present specification, a hole formed on the common metal interconnection 30 by removing the common metal interconnection 30 where the columnar spacer 40 makes contact is referred to as a through hole or the opening of the common metal interconnection 30. A hole for conducting electricity to the contact electrode 107, for example, is referred to as a contact hole. In FIG. 1, the columnar spacer 40 makes contact on the TFT substrate in the through hole formed on the common metal interconnection 30. Consequently, for example, in the case in which a pressure is applied to the counter substrate 200 with a finger, the side wall of the through hole prevents from the columnar spacer 40 from moving, and the columnar spacer 40 stays in the through hole. In other words, the opportunity of the columnar spacer 40 to cut the alignment film 113 is reduced, and consequently, the probability of producing the cuttings of the alignment film 113 is also reduced. The positional displacement between the TFT substrate 100 and the counter substrate 200 is also prevented.

The configuration described above is an example. For example, an inorganic passivation film is sometimes formed between the contact electrode 107 and the organic passivation film 109. The forming process of the contact hole 130 is sometimes different depending to types of liquid crystal devices. In the following, the configurations of first to eighth embodiments of the present invention will be described in detail.

First Embodiment

Figure 2:
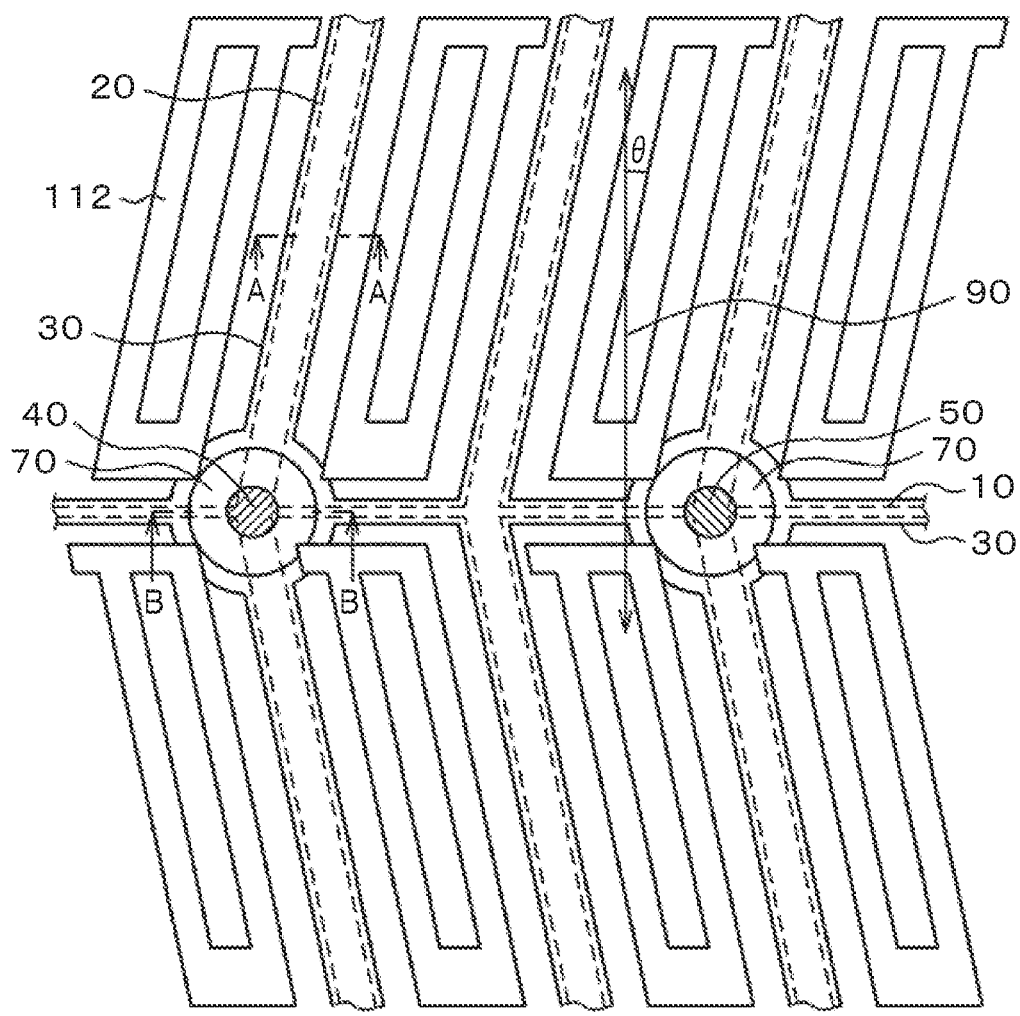
FIG. 2 is a plan view of pixels according to a first embodiment.

FIG. 2 is a plan view of pixels according to a first embodiment of the present invention. In FIG. 2, an alignment direction 90 of an alignment film to determine the initial alignment of liquid crystal molecules is the vertical direction in FIG. 2. A pixel electrode 112 is an electrode in stripes (a plurality of lines) with a slit. The pixel electrode 112 is sometimes a line electrode with no slit. In order to define the rotation direction of liquid crystal molecules in applying a voltage to a liquid crystal, the length of the pixel electrode 112 is at a predetermined angle θ to an alignment direction 90. The angle θ ranges from an angle five to 15 degrees.

The pixel electrode 112 is formed in a region surrounded by a scanning line 10 and a picture signal line 20. The picture signal line 20 is tilted as matched with the slope θ of the pixel electrode. Thus, the picture signal line 20 bends and extends in the vertical direction, and is arrayed in the lateral direction. The scanning line 10 extends in the lateral direction, and is arrayed in the vertical direction. In FIG. 2, to a common electrode 110, a common metal interconnection 30 is connected to cover the picture signal line 20 and the scanning line 10.

The common electrode 110 is formed of ITO. The common metal interconnection 30 is connected to the common electrode 110 in order to decrease the resistance of the common electrode 110. The common metal interconnection 30 is made of a metal mainly containing Al, which has a low electrical resistance. The thickness is 150 nm or more, and thinner than the thickness of the picture signal line 20. The thickness of the picture signal line 20 is about 500 nm. In FIG. 2, the area of the common metal interconnection 30 is increased as well in a region including the picture signal line 20 crossing the scanning line 10. A through hole 70 is formed on the common metal interconnection 30 in the region.

In the through hole 70, the tip end of a main columnar spacer 40 and the tip end of a sub-columnar spacer 50, which are formed on a counter substrate 200, are disposed. In other words, the tip ends of the main columnar spacer 40 and the sub-columnar spacer 50 are surrounded by the common metal interconnection 30. Here, the main columnar spacer 40 defines the gap between a TFT substrate 100 and the counter substrate 200 in the normal state. The tip end is always in contact with the TFT substrate 100. On the other hand, the tip end of the sub-columnar spacer 50 is not in contact with the TFT substrate 100 in the normal state. In the case in which a pressing force is applied to the counter substrate 200, the tip end contacts the TFT substrate 100 to prevent the gap between the TFT substrate 100 and the counter substrate 200 from being too small. In the following, the main columnar spacer 40 and the sub-columnar spacer 50 are represented by the main columnar spacer 40 for describing the columnar spacers 40 and 50.

Figure 3:
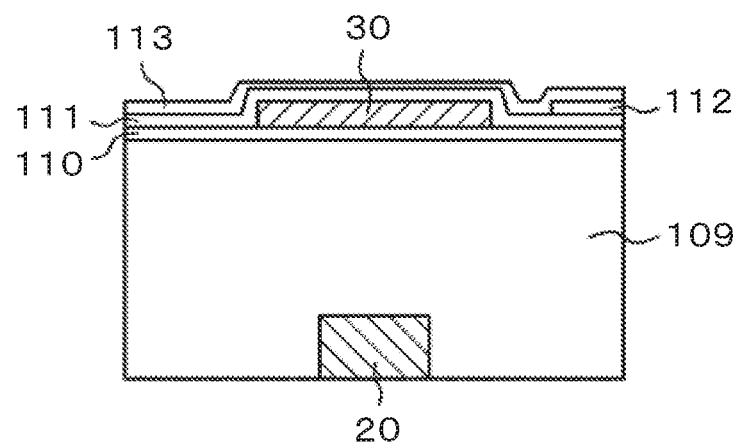
FIG. 3 is a cross sectional view taken along line A-A in FIG. 2.

FIG. 3 is a cross sectional view taken along line A-A in FIG. 2. In FIG. 3, the layers below the picture signal line 20 are omitted. The layers below the picture signal line 20 are similarly omitted in cross sectional views below. In FIG. 3, above the picture signal line 20, the common metal interconnection 30 is disposed above an organic passivation film 109. The thickness of the common metal interconnection 30 is thinner than the thickness of the picture signal line 20. The width is wider than the width of the picture signal line 20. As described later, the common metal interconnection 30 blocks light reflected off the side surface of the picture signal line 20, and prevents a decrease in contrast.

Figure 4:
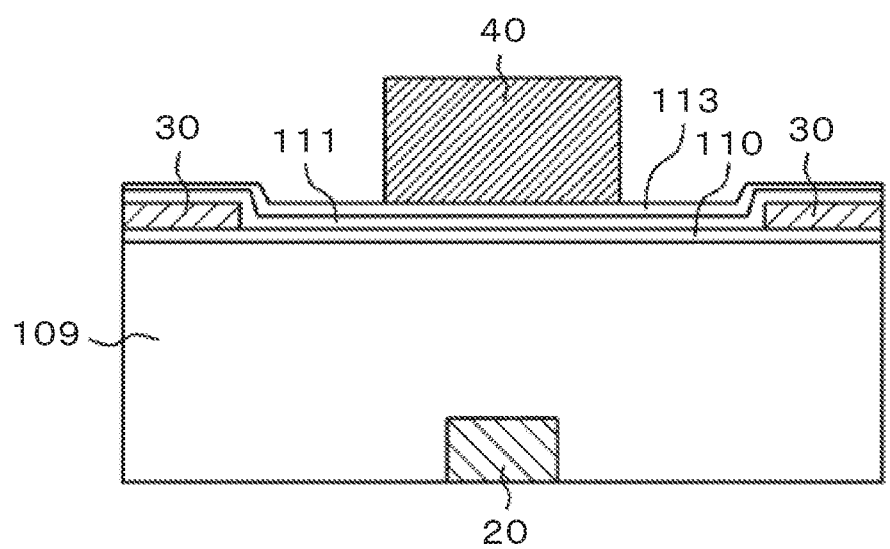
FIG. 4 is a cross sectional view taken along line B-B in FIG. 2.
Figure 5:
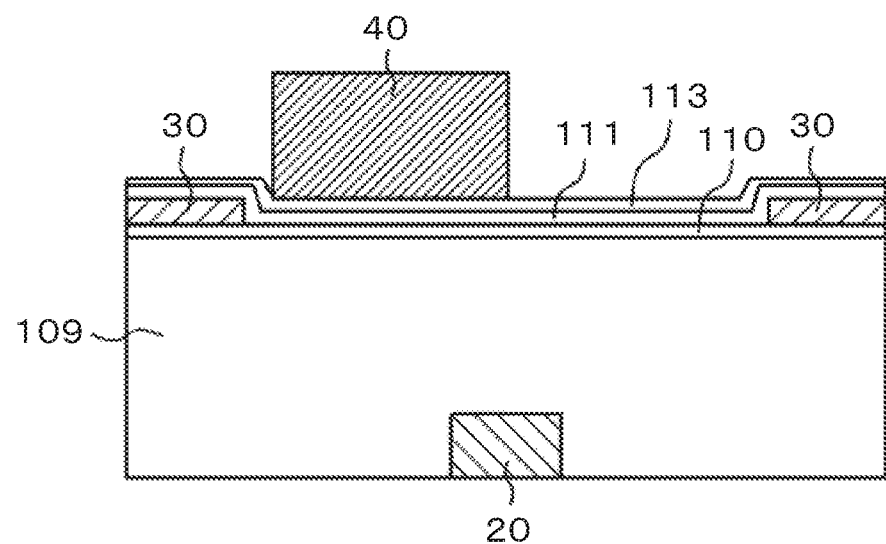
FIG. 5 is a cross sectional view of an effect according to an embodiment of the present invention.

FIG. 4 is a cross sectional view taken along line B-B in FIG. 2. In FIG. 4, the through hole is formed on the common metal interconnection 30. The columnar spacer 40 formed on the counter substrate 200 is in contact with a recess corresponding to the through hole. FIG. 5 is a cross sectional view in the case in which an external force is applied to the counter substrate 200 and the columnar spacer 40 is horizontally displaced. In this case, the columnar spacer 40 contacts the side wall of the recess, and the columnar spacer 40 remains in the recess. Thus, the counter substrate 200 is prevented from being horizontally displaced with respect to the TFT substrate 100. An alignment film 113 is also prevented from being cut by the columnar spacer 40. In other words, the cuttings from the alignment film 113 cause bright spots. Accordingly, the first embodiment of the present invention can prevent the occurrence of bright spots.

Figure 6:
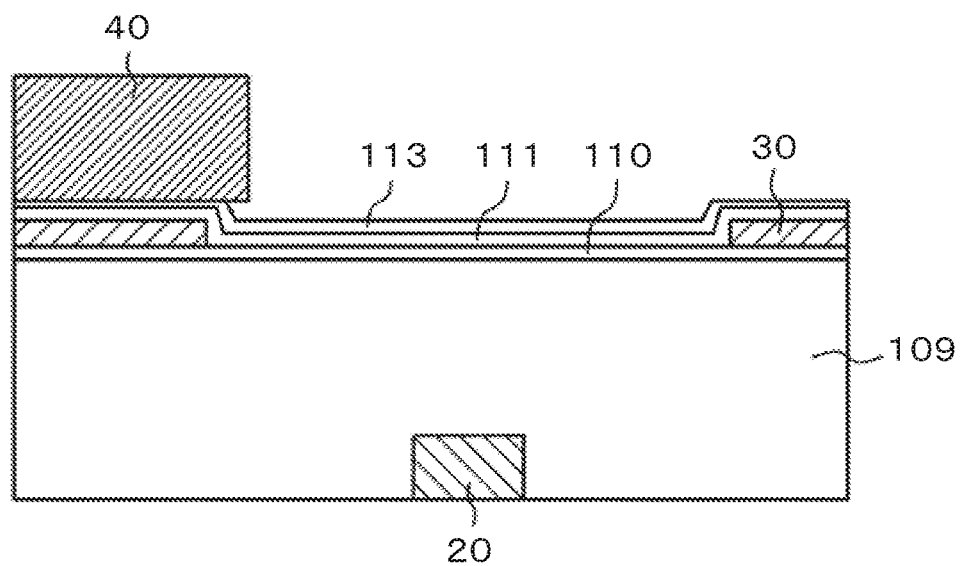
FIG. 6 is a cross sectional view of an effect according to an embodiment of the present invention in the case in which a TFT substrate is greatly displaced from a counter substrate.

FIG. 6 is a cross sectional view in the state in which a strong lateral force is applied to the counter substrate 200 and the columnar spacer 40 rides on the adjacent region beyond the recess. As illustrated in FIG. 6, on the region around the through hole, a projection on the common metal interconnection 30 is formed. The film thickness of the alignment film 113 is smaller than the height inside the recess due to the leveling effect in coating an alignment film material. Therefore, supposing that as illustrated in FIG. 6, the columnar spacer 40 rides on the region around the through hole, the cut of the alignment film 113 can be reduced.

As described above, according to the first embodiment of the present invention, the through hole 70 is formed on the common metal interconnection 30, and the columnar spacer 40 is formed on the counter substrate 200 corresponding to the through hole. Consequently, the positional displacement between the counter substrate 200 and the TFT substrate 100 can be prevented, as well as the alignment film can be prevented from being cut caused by the columnar spacer 40.

Second Embodiment

Figure 7:
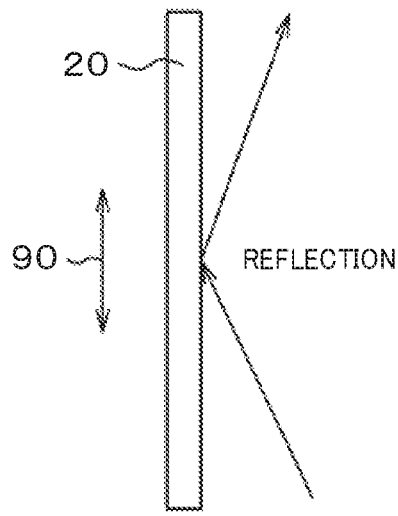
FIG. 7 is a schematic diagram of the reflection of polarized light in the case in which an alignment axis is in parallel with a reflection plane.
Figure 8:
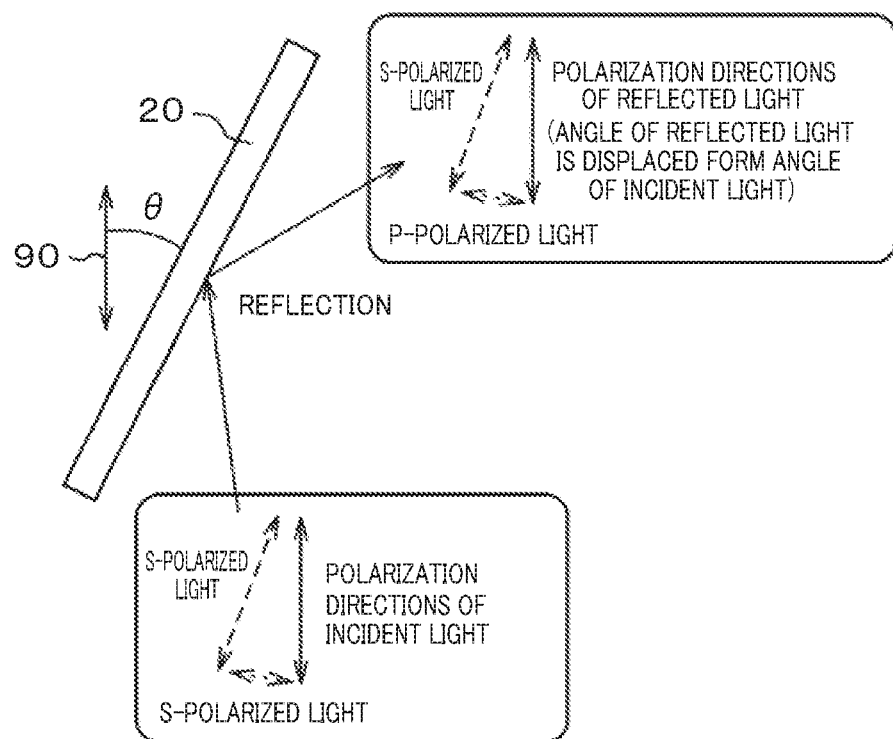
FIG. 8 is a schematic diagram of the reflection of polarized light in the case in which the alignment axis is not in parallel with the reflection plane.

A second embodiment of the present invention will be described. FIG. 7 is a schematic diagram of the reflection of light off the side surface of the picture signal line 20 in the case in which the alignment direction 90 of the liquid crystal molecules is the same as the extending direction of the picture signal line 20. In this case, P-polarized light components are absent, and the ratios of S-polarized light and P-polarized light are the same. Thus, the direction of the polarization axis of reflected light is not changed. FIG. 8 is a schematic diagram in the case in which the alignment direction 90 of the liquid crystal molecules and the extending direction of the picture signal line 20 form an angle, e.g. an angle θ. In this case, the reflectance of P-polarized light is smaller than the reflectance of S-polarized light. Consequently, the polarization axis of the incident light and the polarization axis of the reflected light are changed. The greater the angle θ is, the greater the displacement between the polarization axes is. This causes a poor analyzing effect of an upper polarizer, resulting in light leakage even in black display. In other words, contrast is decreased.

However, in the IPS mode, the predetermined angle θ has to be maintained in a range of an angle of about five to 15 degrees in order to prevent domains. In other words, in order to prevent a decrease in contrast, light reflected off the side surface of the picture signal line 20 has to be blocked as much as possible.

Figure 9:
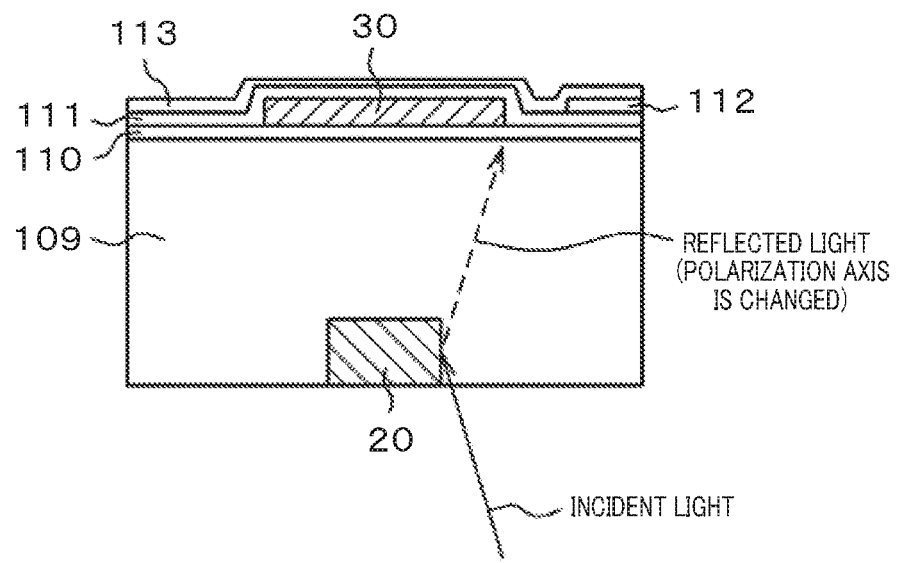
FIG. 9 is a cross sectional view of a second embodiment.

FIG. 9 is a cross sectional view of a configuration of the second embodiment of the present invention. As illustrated in FIG. 9, the width of the common metal interconnection 30 formed on the picture signal line 20 is greater than the width of the picture signal line 20, and the common metal interconnection 30 blocks light reflected off the side surface of the picture signal line 20. Light is also reflected off the side surface of the common metal interconnection 30. However, the thickness of the common metal interconnection 30 is smaller than the thickness of the picture signal line 20. Thus, light reflected off the side surface of the common metal interconnection 30 can be made smaller than light reflected off the side surface of the picture signal line 20. Accordingly, contrast can be improved.

Figure 10:
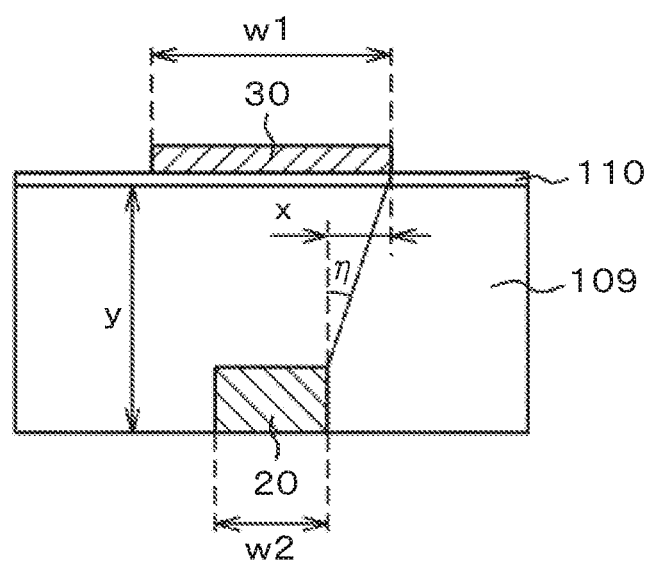
FIG. 10 is a cross sectional view of the relationship between the width of a picture signal line and the width of a common metal interconnection according to an embodiment of the present invention.

FIG. 10 is a schematic diagram of the concept of properly providing the width of the common metal interconnection 30 and the width of the picture signal line 20. In FIG. 10, x=y tan η, where the film thickness of the organic passivation film 109 is defined as y, and a distance from one edge of the common metal interconnection 30 to one edge of the picture signal line 20 in width is defined as x. In this equation, the thickness of the picture signal line 20 is smaller than the thickness of the organic passivation film, and thus ignored. Also in the case in which an inorganic passivation film is present between the organic passivation film 109 and the picture signal line 20, the film thickness of the inorganic passivation film is smaller than the film thickness of the organic passivation film 109, and thus ignored. x=(w1−w2)/2, where the width of the common metal interconnection 30 is defined as w1, and the width of the picture signal line 20 is defined as w2.

In the configuration in FIG. 10, a significant effect can be obtained, where η is an angle of five degrees or more. In other words, for the impression of contrast, contrast is specifically greatly affected when the screen is viewed in front. In other words, from the fact that light is refracted in emitting the light from a liquid crystal display panel to the outside, in FIG. 10, η has to be an angle of five degrees or more for obtaining a significant effect. On the other hand, although an increase in the distance x improves contrast, this increase decreases transmittances. From the viewpoint of properly providing transmittances, the distance x is desirably 3 μm or less, and more preferably 2.5 μm or less.

In the description above, the common metal interconnection 30 is an Al alloy single layer, for example. The common metal interconnection 30 may be formed of a plurality of layers, not limited to this Al alloy single layer. For example, a MoW thin film can be formed on and below an Al or Al alloy layer. Forming a refractory metal on an Al containing layer can prevent an event in which an Al hillock grows to break the capacitive insulating film 111 and the alignment film 113, and then reaches the liquid crystal layer 300 for disturbing electric fields in the liquid crystal layer 300. The direct contact of an Al alloy with ITO oxidizes Al. This sometimes possibly causes a poor electrical conduction of the Al alloy to ITO. Forming a refractory metal below the Al containing layer can prevent Al from being oxidized, allowing a good electrical conduction of ITO to the common metal interconnection 30.

Figure 11:
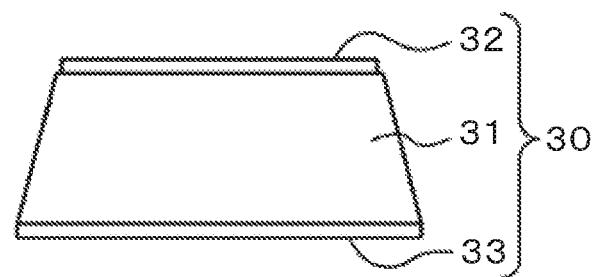
FIG. 11 is a cross sectional view in the case in which the cross section of the common metal interconnection is in a trapezoid.
Figure 12:
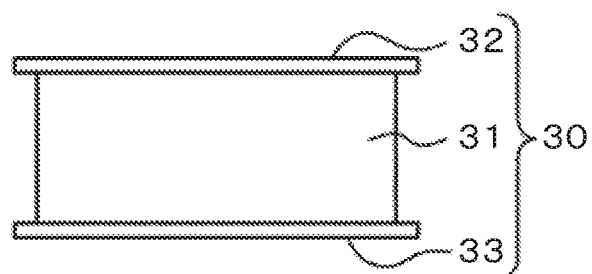
FIG. 12 is a cross sectional view of another example of the common metal interconnection.
Figure 13:
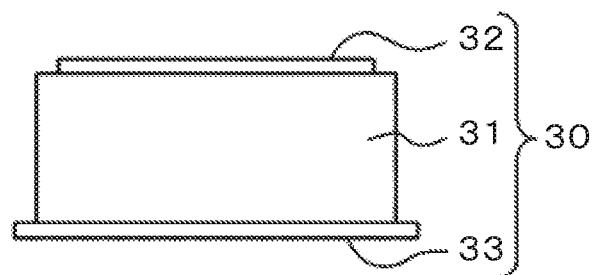
FIG. 13 is a cross sectional view of still another example of the common metal interconnection.
Figure 14:
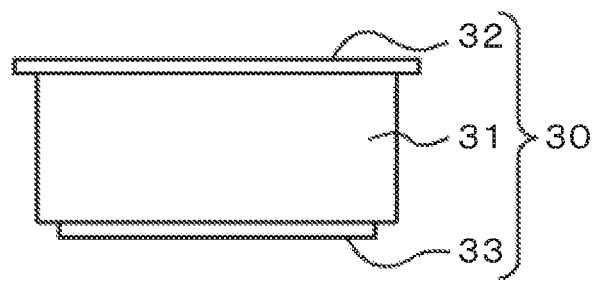
FIG. 14 is a cross sectional view of still another example of the common metal interconnection.

The cross sectional shape of the common metal interconnection 30 includes a rectangle as well as a trapezoid as illustrated in FIG. 11. A trapezoid cross section can decrease the possibility of causing disconnection in forming a film on the common metal interconnection 30. In FIG. 11, the thickness of an Al alloy 31 is 130 nm, the thickness of a MoW upper layer 32 is 10 nm, and the thickness of a MoW lower layer 33 is about 20 nm. For example, an Al alloy includes AlSi, AlCu, and AlNb. The upper layer and the lower layer include MoCr, Mo, and Ti in addition to MoW. The upper layer can be formed of a metal having its reflectance lower than a metal contained in the lower layer. The thicknesses and materials of the Al alloy, the upper layer, and the lower layer are similar also in the case in which the cross sectional shape of the common metal interconnection 30 is a rectangle. The cross sectional shape of the common metal interconnection 30 may include shapes in FIGS. 12, 13, and 14 in addition to the shape in FIG. 11. In FIG. 12, the width of the metal upper layer 32 and the width of the metal lower layer 33 are wider than the width of the Al alloy 31. In FIG. 13, the width of the lower layer 33 is wider than the width of the Al alloy 31, and the width of the upper layer 32 is smaller than the width of the Al alloy 31. In FIG. 14, the width of the upper layer 32 is wider than the width of the Al alloy 31, and the width of the lower layer 33 is smaller than the width of the Al alloy 31. All the cases can achieve the effect according to the second embodiment of the present invention.

Third Embodiment

Figure 15:
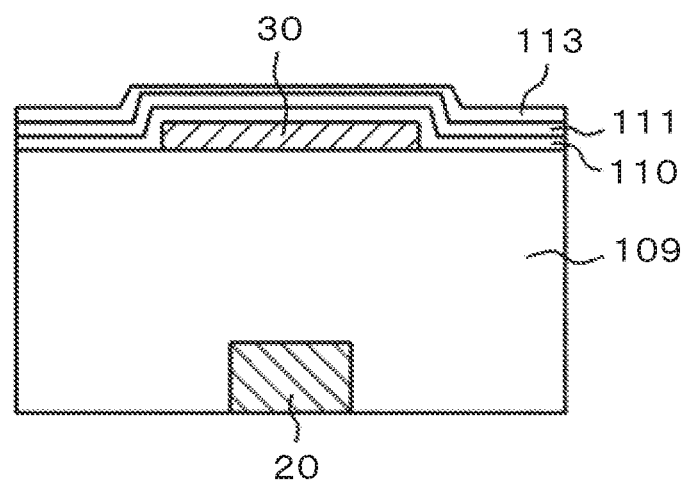
FIG. 15 is a cross sectional view of a third embodiment.

A third embodiment of the present invention will be described. In the first and second embodiments, the common metal interconnection 30 is disposed on the upper side of the common electrode 110. However, the common metal interconnection 30 can be formed on the lower side of the common electrode 110. FIG. 15 is this example. In FIG. 15, the common metal interconnection 30 is formed on the upper side of the organic passivation film 109 (on the liquid crystal layer side). On the common metal interconnection 30, the common electrode 110 is formed. On the common electrode 110, the capacitive insulating film 111 is formed. On the capacitive insulating film 111, the alignment film 113 is formed.

The plan disposition of the common metal interconnection 30 is similar to the plan disposition in FIG. 2. The common metal interconnection 30 is formed to cover the scanning line 10 and the picture signal line 20. As illustrated in FIG. 4, a through hole is similarly formed on the common metal interconnection 30, and then the tip end of the columnar spacer 40 contacts the recess. The effect is exerted similarly to the effect described in FIGS. 5 and 6.

The common metal interconnection 30 according to the embodiment can also have a stacked structure of an Al interconnection and a refractory metal. In the case of the embodiment, the common electrode 110 formed of ITO is disposed on the common metal interconnection 30. Thus, a lower refractory metal layer is not necessarily disposed. The cross sectional shape of the common metal interconnection 30 is not necessarily a rectangle. The shape may be a trapezoid. This is similar to the first embodiment.

Figure 16:
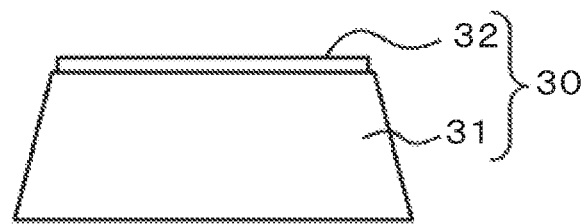
FIG. 16 is a cross sectional view of another example in the case in which the cross section of the common metal interconnection is in a trapezoid.
Figure 17:
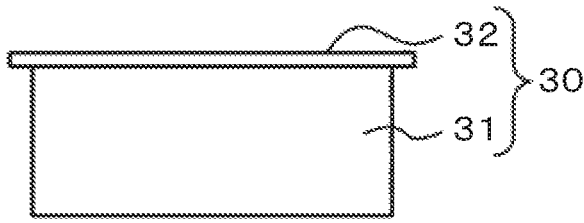
FIG. 17 is a cross sectional view of another example of the common metal interconnection.
Figure 18:
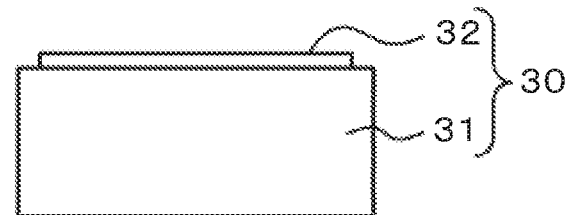
FIG. 18 is a cross sectional view of still another example of the common metal interconnection.

FIG. 16 is a diagram in the case in which the cross sectional shape of the common metal interconnection 30 is a trapezoid. In FIG. 16, the thickness of the Al alloy 31 is 130 nm, the thickness of the MoW upper layer 32 is 10 nm, and no lower layer is present. In FIG. 17, the width of the upper layer 32 is wider than the width of the Al alloy 31. In FIG. 18, the width of the upper layer 32 is smaller than the width of the Al alloy 31. No lower layer is present in both of FIGS. 17 and 18.

In any cases in the embodiment, the following effect of the embodiment of the present invention can be obtained. For example, the positional displacement between the counter substrate 200 and the TFT substrate 100 can be prevented. The cut of the alignment film 113 can be prevented. Also in the embodiment, with the configuration of the second embodiment, a decrease in contrast can be prevented. This decrease is caused by the displacement between the polarization axes because of light reflected off the side surface of the picture signal line 20. In the first to third embodiments, the common electrode 110 may be removed from the through hole 70 on the common metal interconnection 30.

Fourth Embodiment

Figure 19:
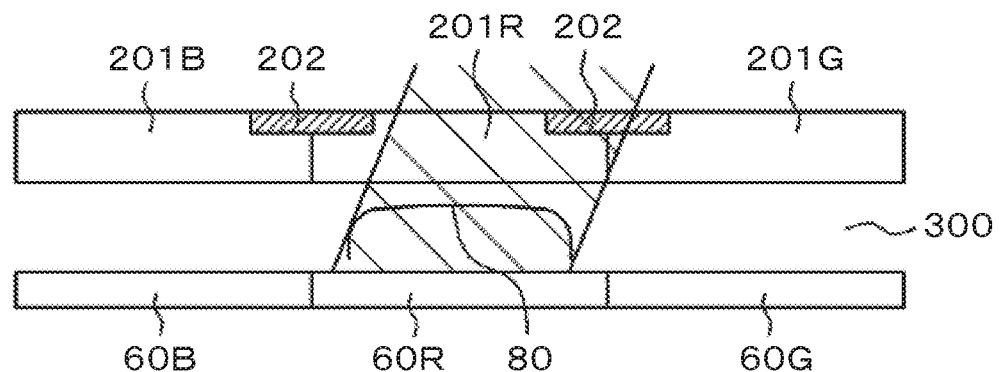
FIG. 19 is a cross sectional view in the case in which the TFT substrate is not displaced from the counter substrate.
Figure 20:
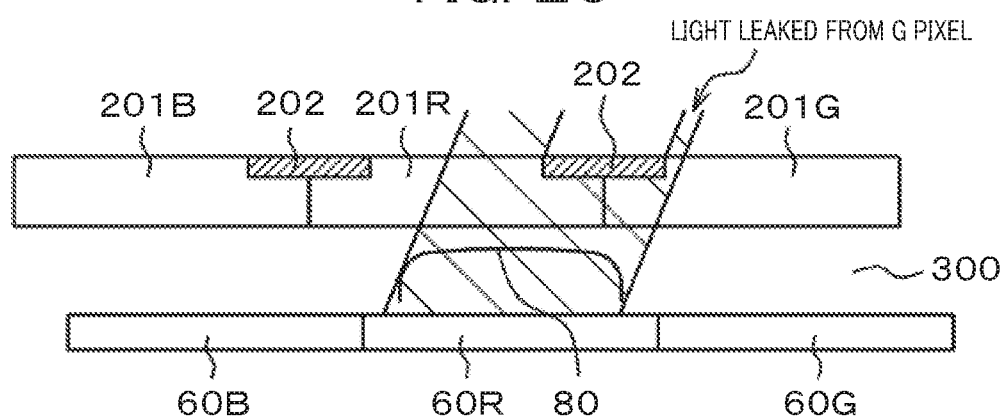
FIG. 20 is a cross sectional view in the case in which the TFT substrate is displaced from the counter substrate to cause color mixture.

A fourth embodiment of the present invention will be described. The embodiment has a configuration in which the common metal interconnection 30 is used for preventing color mixture. FIGS. 19 and 20 are cross sectional views illustrating a problem of color mixture. In FIG. 19, on the counter substrate 200, a blue color filter 201B, a red color filter 201R, and a green color filter 201G are formed. A black matrix 202 is disposed between the color filters 201B, 201R, and 201G. On the TFT substrate 100 on the opposite side of the liquid crystal layer 300, a blue pixel 60B, a red pixel 60R, and a green pixel 60G are formed. The transmittance of the pixel is expressed by a curve 80.

In FIG. 19, no positional displacement is present between the TFT substrate 100 and the counter substrate 200, causing no color mixture. In FIG. 20, a positional displacement is present between the TFT substrate 100 and the counter substrate 200. In FIG. 20, for example, a part of light obliquely emitted from the red pixel 60R is transmitted through the green color filter 201G. This is color mixture. Color mixture degrades color purity.

Figure 21:
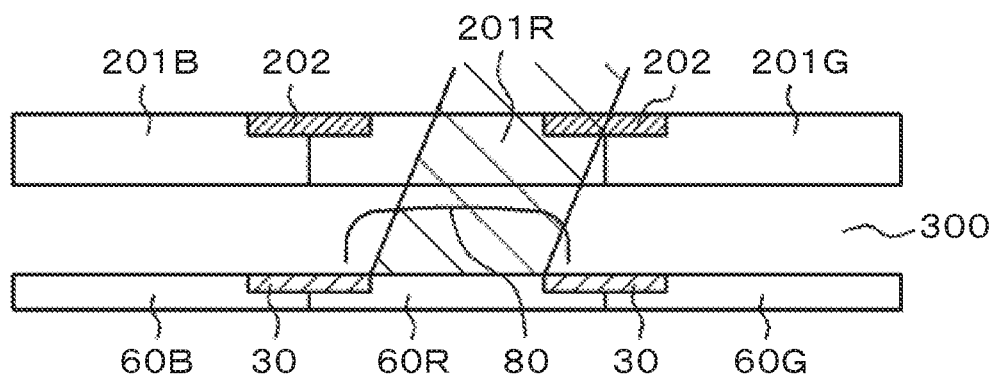
FIG. 21 is a cross sectional view in the case in which the TFT substrate is not displaced from the counter substrate in an embodiment of the present invention.

FIG. 21 is a diagram of the configuration according to the embodiment. In FIG. 21, the common metal interconnection 30 in a predetermined width is formed on the boundary between the pixels on the TFT substrate. The other configurations are similar to FIG. 19. In FIG. 21, no positional displacement is present between the TFT substrate 100 and the counter substrate 200.

Figure 22:
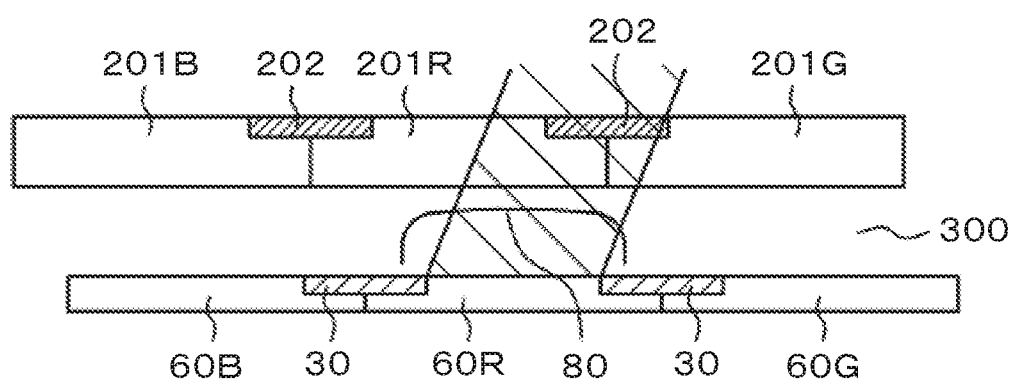
FIG. 22 is a cross sectional view of an effect according to an embodiment of the present invention.

In FIG. 22, a positional displacement is present between the TFT substrate 100 and the counter substrate 200. As illustrated in FIG. 22, according to the fourth embodiment of the present invention, forming the common metal interconnection 30 can also prevent color mixture caused by light obliquely emitted from the pixels on the TFT substrate. This is because the common metal interconnection 30 blocks light causing color mixture. Supposing that no positional displacement is present, color mixture is sometimes caused depending on the width of the light shielding film 202 or the angle from the normal direction of the display panel when an observer views the panel. The provision of the common metal interconnection 30 can prevent color mixture in these cases.

Color mixture causes influence differently in blue, red, and green. For example, in some cases, red color mixture is more specifically noticeable. In some cases, blue color mixture is noticeable. Therefore, blocking specific colors causing a noticeable color mixture is sometimes effective depending on types of display devices. According to the fourth embodiment of the present invention, varying the width of the common metal interconnection 30 for each color allows easily achieving this configuration.

Figure 23:
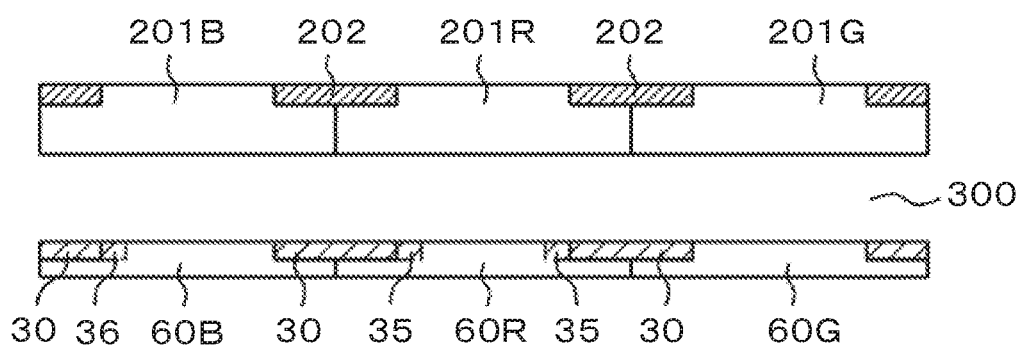
FIG. 23 is a cross sectional view of another form according to an embodiment of the present invention.

FIG. 23 is a diagram of an example of this configuration. In the sample in FIG. 23, the width of the common metal interconnection 30 is increased for the red pixel 60R and the blue pixel 61B. Color mixture is noticeable in red and blue. In FIG. 23, an increase 35 of the common metal interconnection 30 is formed for the red pixel 60R. An increase 36 of the common metal interconnection 30 is formed for the blue pixel 60B. The green pixel 60G more greatly affects the luminosity than the red pixel 60R and the blue pixel 60B do. Thus, the transmittance of the green pixel 60G is greater than the transmittances of the red pixel 60R and the blue pixel 60B.

For example, in the case in which the influence of color mixture caused by the red pixel 60R is specifically large, the width of the common metal interconnection 30 can be increased only on the boundary of the red pixel 60R. For example, in the case in which the influence of color mixture caused by the blue pixel 60B is specifically large, the width of the common metal interconnection 30 can be increased only on the boundary of the blue pixel 60B. In other words, the width of the common metal interconnection 30 on the boundary between two pixels can be increased only to one pixel. On both sides of a pixel, the width of the common metal interconnection 30 can be increased only to one side. In any cases, necessary configurations can be achieved only by changing exposure masks for patterning the common metal interconnection 30. Any configurations are possible other than the configuration in which the width of the common metal interconnection 30 is varied on each boundary of the pixels. For example, a configuration is possible in which the common metal interconnections 30 have the same width and the center of the common metal interconnection 30 is displace from the center of the picture signal line 20. This configuration can prevent a decrease in the aperture ratio.

Fifth Embodiment

Figure 24:
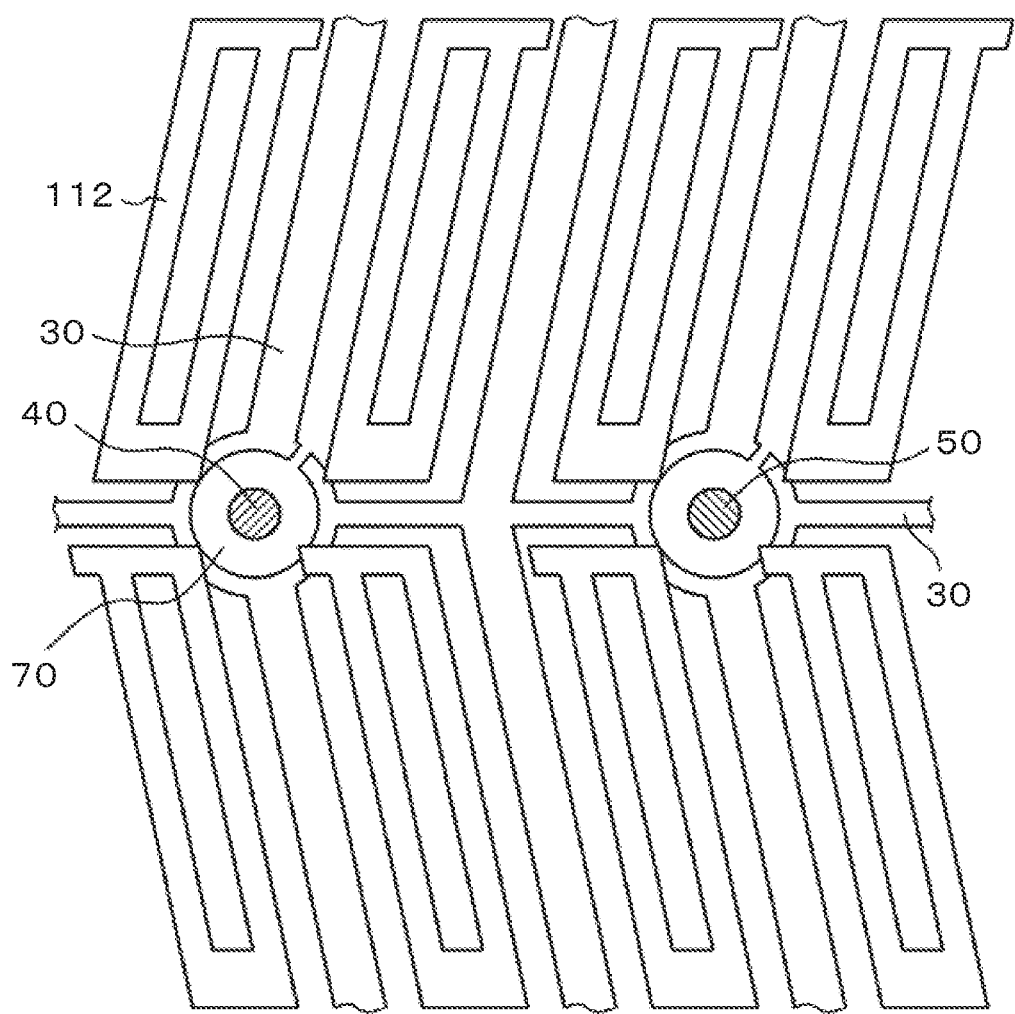
FIG. 24 is a plan view of a fifth embodiment.

A fifth embodiment of the present invention will be described. In the case in which a through hole is formed on the common metal interconnection 30 and the tip end of the columnar spacer 40 or the sub-columnar spacer 50 is disposed in the through hole, the alignment film is sometimes formed thick in the recess of the through hole. In the following, this phenomenon will be described with the columnar spacer 40. In this case, the columnar spacer 40 is likely to increase the cut of the alignment film. The embodiment has the following configuration. As illustrated in FIG. 24, a notch is formed on the common metal interconnection 30 surrounding the through hole 70. The common metal interconnection 30 is not formed in the notch. In coating the alignment film material, the alignment film material easily goes out of the recess through the notch. Consequently, the alignment film is prevented from being formed thick in the recess. In FIG. 24, one notch is formed. However, notches can be formed in any number. For example, two or more notches may be formed. Notches can be formed at any locations other than the location in FIG. 24.

Figure 25:
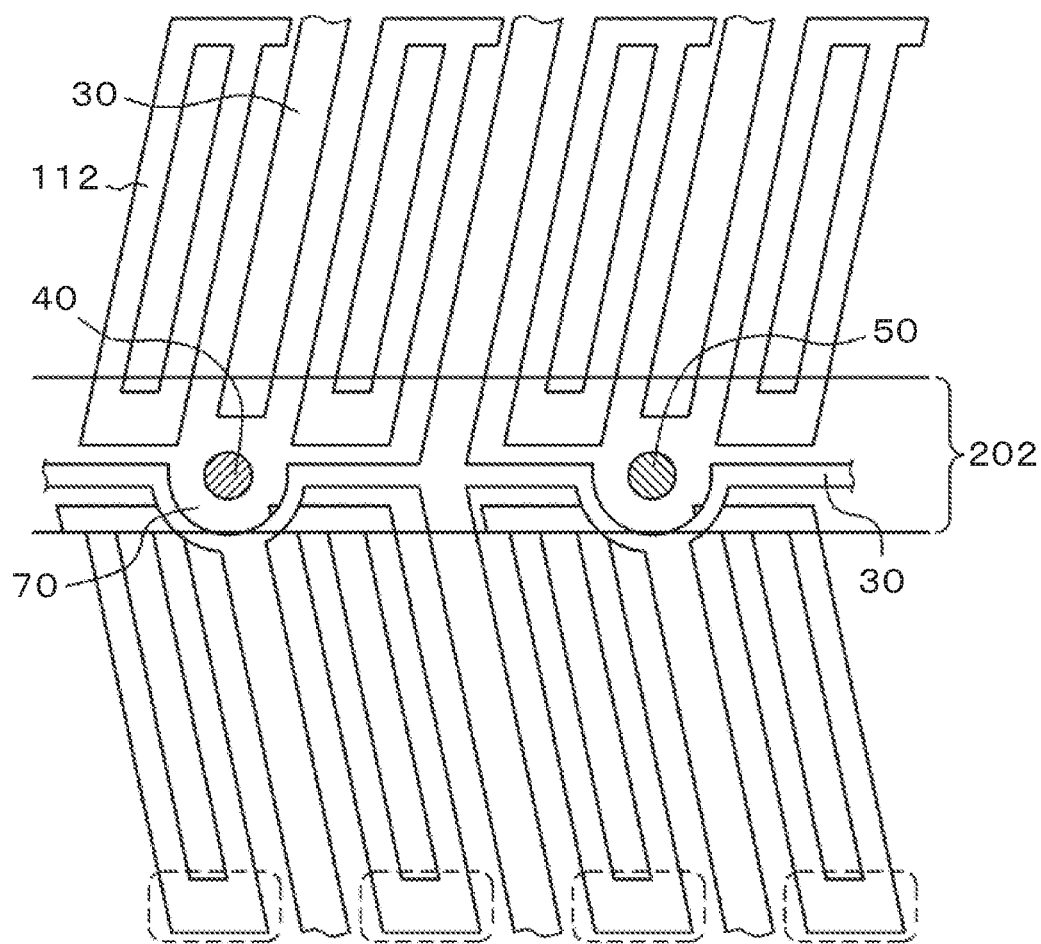
FIG. 25 is a plan view of another form of the fifth embodiment.

FIG. 25 is another example of the embodiment. In FIG. 25, a half of the through hole 70 is opened. In this case, the stopper for the columnar spacer 40 is absent on the open side of the through hole 70. In FIG. 25, the light shielding film (the black matrix) 202 is formed on the counter substrate 200. The through hole 70 is disposed in such a manner that the center of the through hole 70 is located near to the lower edge of the black matrix 202 where the notch (the opening) is absent. The distance from the center to the upper edge of the black matrix 202 is longer than the distance from the center to the lower edge. In other words, the tolerance to light leakage is great even though the stopper for the columnar spacer 40 is absent in this direction. Thus, a decrease in contrast can be prevented.

As described above, according to the embodiment, the notch is formed on the through hole 70 of the common metal interconnection 30 for accommodating the columnar spacer 40. Consequently, a thick alignment film is prevented from being formed in the through hole 70. Thus, the cut of the alignment film caused by the columnar spacer 40 can be prevented. In FIG. 25, in the extending direction of the common metal interconnection 30 in parallel with the scanning line 10, the common metal interconnection 30 surrounding the through hole 70 is opened on its upper side, whereas the common metal interconnection 30 surrounding the through hole 70 is not opened on its lower side. In this configuration, a half of the through hole is opened. However, a configuration may be possible in which in the extending direction of the common metal interconnection 30 in parallel with the scanning line 10, the common metal interconnection 30 is partially provided on its upper side. In the case in which the common metal interconnection 30 extending in the direction in parallel with the scanning line 10 has the opening on the through hole, approximately a half of the perimeter of the through hole is opened, from which the common metal interconnection 30 is removed. This is the definition of a half opened through hole. Any size of the opening is possible. A half or more or a half or less of the perimeter of the through hole may be opened.

Sixth Embodiment

Figure 26:
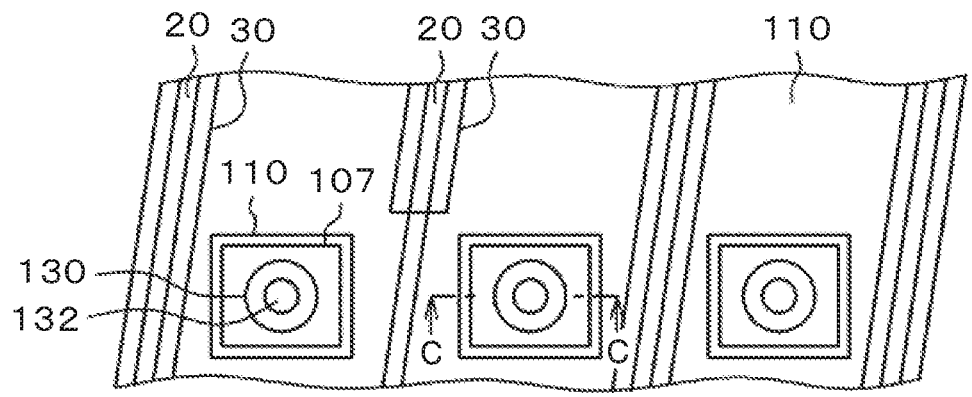
FIG. 26 is a plan view of a first example according to a sixth embodiment.

A sixth embodiment of the present invention will be described. In the embodiment, examples of the positional relationship between the common electrode 110 and the common metal interconnection 30 are shown. FIG. 26 is a plan view of a first form of the embodiment. In FIG. 26, the pixel electrode 112 is omitted. In order to conduct electricity from the pixel electrode 112 to the contact electrode 107, a contact hole 132 is formed on the capacitive insulating film 111 in the contact hole 130.

In FIG. 26, the common electrode 110 is formed entirely on the substrate. On the other hand, in the contact hole 130, the pixel electrode 112 extends. Thus, the common electrode 110 is not formed in the contact hole 130 in order to avoid the short circuit of the pixel electrode 112 with the common electrode 110 in the contact hole 130.

Figure 31:
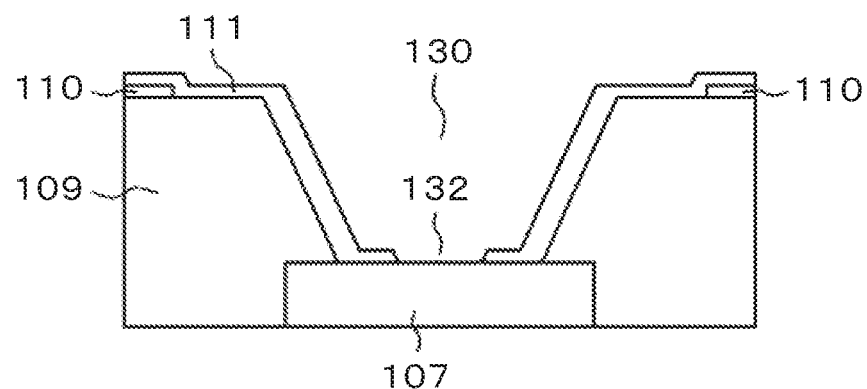
FIG. 31 is a cross sectional view taken along line C-C in FIG. 26.

FIG. 31 is a cross sectional view of the configuration, taken along line C-C in FIG. 26. In FIG. 31, the pixel electrode is omitted. In FIG. 31, the common electrode 110 is not formed on the inner side of the contact hole 130 including its side wall. In FIG. 31, the contact hole 132 is formed on the capacitive insulating film 111 on the inner side of the contact hole 130.

Again referring to FIG. 26, the common metal interconnection 30 covers the picture signal line 20. The width is formed wider than the width of the picture signal line 20. In order to dispose the columnar spacer 40 as described above, in FIG. 26, the common metal interconnection 30 covering the picture signal line 20 is provided on every other picture signal line 20 near the contact hole 130. In other words, the opening is provided on the common metal interconnection 30 on every other picture signal line 20 near the contact hole 130. The opening (the notch) of the common metal interconnection 30 may be provided at any number of spacings of the picture signal lines 20. With this configuration, the cut of the alignment film caused by the columnar spacer 40 as well as a decrease in the resistance of the common metal interconnection 30 can be prevented.

Figure 27:
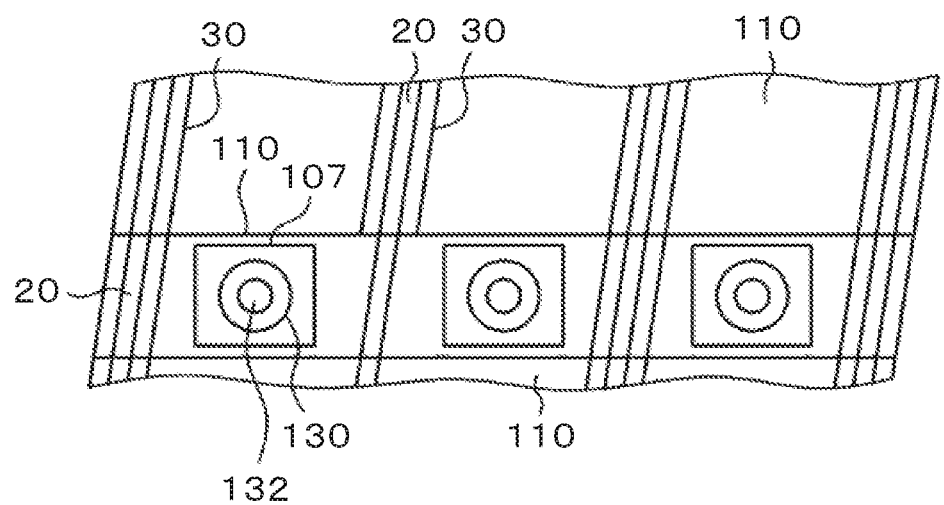
FIG. 27 is a plan view of a second example according to the sixth embodiment.
Figure 28:
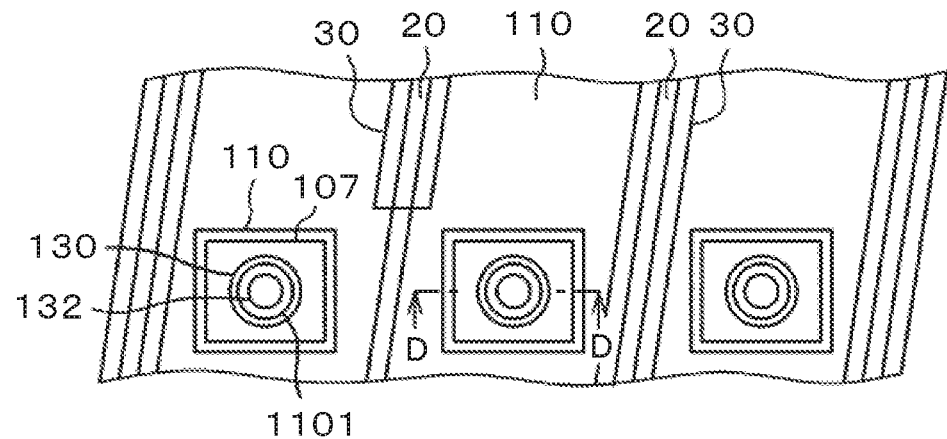
FIG. 28 is a plan view of a third example according to the sixth embodiment.
Figure 32:
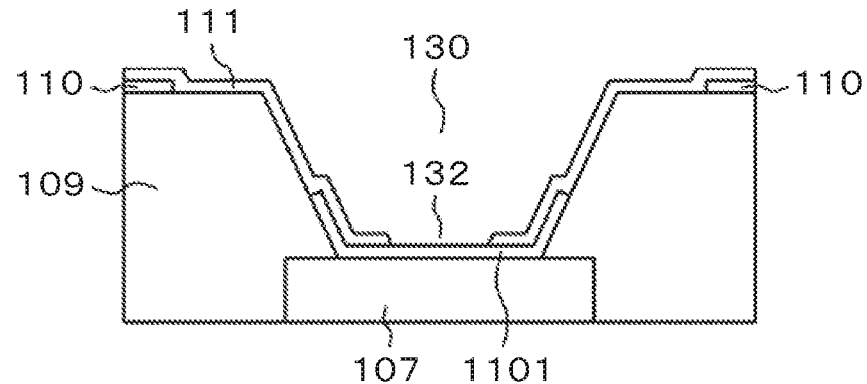
FIG. 32 is a cross sectional view taken along line D-D in FIG. 28.

FIG. 27 is a second form of the embodiment. In FIG. 27, the common electrodes 110 are formed in lateral stripes with the contact hole 130 being between the common electrodes 110. In other words, in the regions including the contact hole 130, a region with no common electrode 110 is provided in stripes across the pixels. In FIG. 27, the common electrode 110 on the upper side is connected to the common electrode 110 on the lower side through the common metal interconnection 30. The common metal interconnection 30 is made of a metal, and the film thickness is thicker than the film thickness of the common electrode 110. Thus, the resistance across the upper and lower common electrodes 110 can be made much smaller. Also in the embodiment, the common metal interconnection 30 is formed on every other picture signal line 20 in the regions of the contact hole 130. However, the common metal interconnection 30 is formed at any number of spacings of the picture signal lines 20. FIG. 28 is a plan view of a third form of the embodiment. FIG. 28 is different from FIG. 26 in that a protective ITO 1101 is formed to cover the contact hole 130, and the protective ITO 1101 is formed simultaneously when the common electrode 110 is formed. FIG. 32 is a cross sectional view taken along line D-D in FIG. 28. FIG. 32 is different from FIG. 31 in that the protective ITO 1101 is formed between the organic passivation film 109 and the capacitive insulating film 111, and between the contact electrode 107 and the capacitive insulating film 111 near the bottom part of the contact hole 130.

The contact hole 130 has a complicated inner shape, easily causing cracks, for example, on the capacitive insulating film 111. On the other hand, moisture is easily entered to the organic passivation film 109. The entrance of the moisture to the liquid crystal layer through cracks, for example, on the capacitive insulating film 111 degrades the function of the liquid crystal. Therefore, in FIG. 32, forming the protective ITO 1101 between the organic passivation film 109 and the capacitive insulating film 111 prevents moisture present in the organic passivation film 109 from being entered to the liquid crystal. The protective ITO 1101 is formed simultaneously when the common electrode 110 is formed. After patterning, the protective ITO 1101 is connected to the contact electrode 107. Even tough the capacitive insulating film 111 is cracked and the pixel electrode 112 contacts the protective ITO 1101 at the cracked portion, the characteristics of the display device are not affected.

Figure 29:
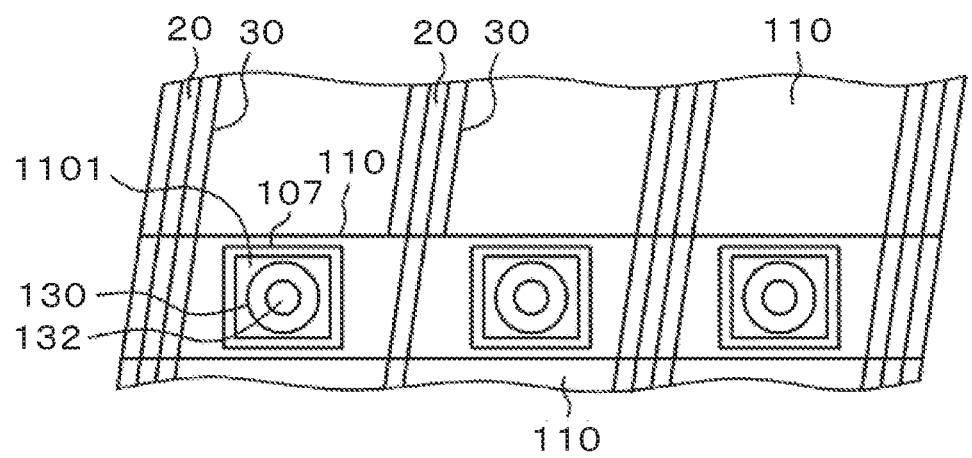
FIG. 29 is a plan view of a fourth example according to the sixth embodiment.

FIG. 29 is a plan view of a fourth form of the embodiment. FIG. 29 is different from FIG. 27 in that the protective ITO 1101 is provided to cover the contact hole 130. The function of the protective ITO 1101 is as described in FIG. 28.

Figure 30:
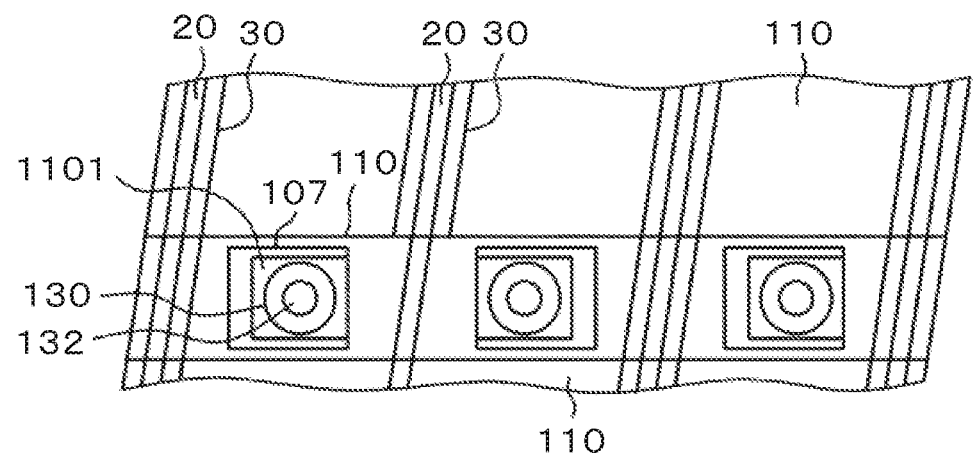
FIG. 30 is a plan view of a fifth example according to the sixth embodiment.

FIG. 30 is a plan view of a fifth form of the embodiment. In FIG. 30, similarly to FIG. 29, the common metal interconnection 30 is formed on every other picture signal line 20 near the regions of the contact hole 130. In FIG. 30, the contact hole 130 and the contact hole 132 of the capacitive insulating film are formed near to the regions in which the common metal interconnection 30 is absent. Consequently, the short circuit of the pixel electrode 112 with the common metal interconnection 30, which is caused by the common metal interconnection 30 entered to the contact hole, can be prevented. In FIG. 30, on the contact electrode 107, the center of the contact hole 130, the position of the protective ITO 1101, and the center of the contact hole 132 formed on the capacitive insulating film 111 are also displaced to the regions in which the common metal interconnection 30 is absent. With this configuration, the components are easily laid out near the contact hole 130.

As described above, according to the embodiment, the common metal interconnection 30 can be easily disposed away from the contact holes 130 and 132. The center of the contact hole 130, the position of the protective ITO 1101, and the center of the contact hole 132 formed on the capacitive insulating film 111 are displaced from the center of the contact electrode 107. However, only a part of the center of the contact hole 130, the position of the protective ITO 1101, and the center of the contact hole 132 may be displaced. These configurations are also applicable to the other embodiments.

Seventh Embodiment

Figure 33:
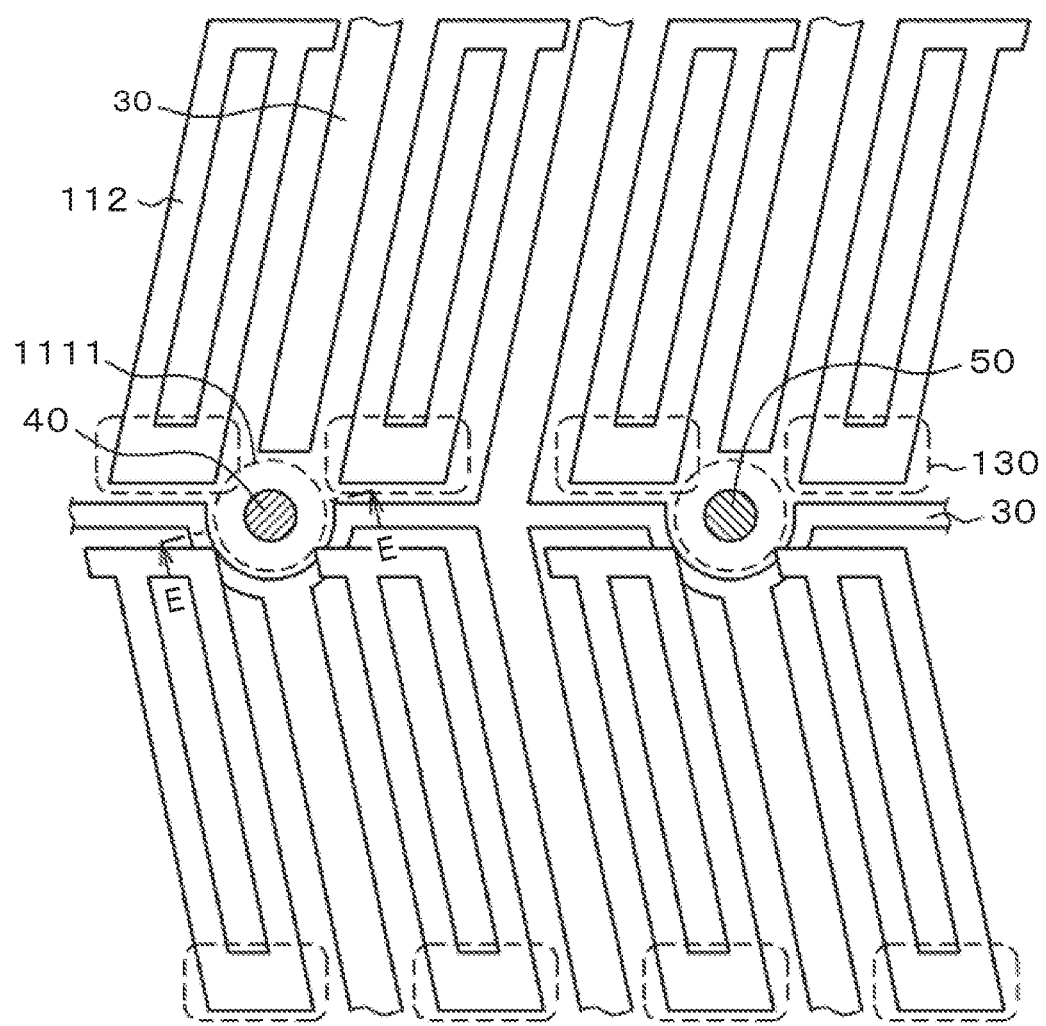
FIG. 33 is a plan view of a seventh embodiment.

A seventh embodiment of the present invention will be described. FIG. 33 is a plan view of the embodiment. In FIG. 33, similarly to the fifth embodiment in FIG. 25, a notch (an opening) is formed on a half of the through hole formed on the common metal interconnection 30. FIG. 33 is different from FIG. 25 in that a through hole 1111 of the capacitive insulating film 111 is also formed in the through hole of the common metal interconnection 30. Dotted lines in FIG. 33 express the through hole 1111 of the capacitive insulating film 111.

Figure 34:
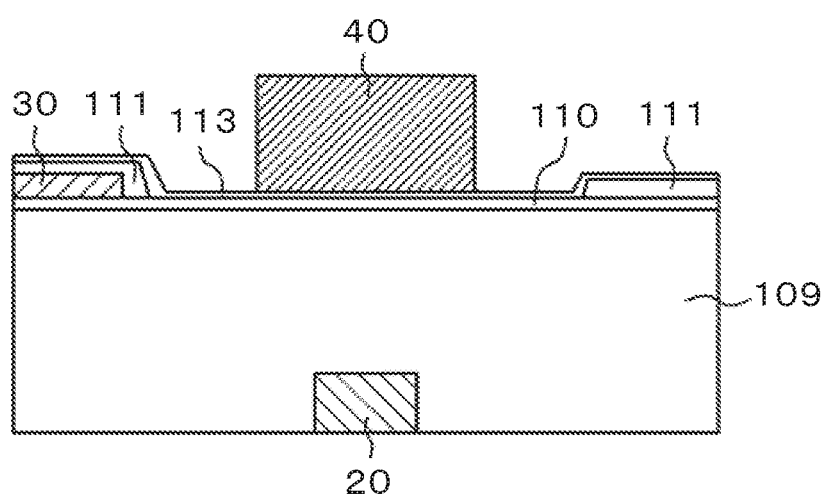
FIG. 34 is a cross sectional view taken along line E-E in FIG. 33.

FIG. 34 is a cross sectional view taken along line E-E in FIG. 33. In FIG. 33, the columnar spacer 40 is in contact with the TFT substrate 100 in the through hole formed on the common metal interconnection 30 and the capacitive insulating film 111. As illustrated in FIGS. 33 and 34, the columnar spacer 40 moves to the lower side in FIG. 33 or to the left side in FIG. 34, and the columnar spacer 40 then collides against a wall of a stacked film of the common metal interconnection 30 and the capacitive insulating film 111. This stacked wall can be a more effective barrier than in the other embodiments.

The columnar spacer 40 moves to the upper side in FIG. 33 or to the right side in FIG. 34, and the columnar spacer 40 then collides against a barrier in the film thickness of at least the capacitive insulating film 111. Thus, a barrier against the columnar spacer 40 can be formed. This is advantageous over the fifth embodiment in FIG. 25.

The embodiment is described by the comparison with the fifth embodiment. Also in the first embodiment, the through hole 1111 of the capacitive insulating film 111 is formed as laid over the through hole of the common metal interconnection 30, and thus a more effective barrier can be formed against the motion of the columnar spacer 40. As described above, in the embodiment, the through hole 1111 is also formed on the capacitive insulating film 111. Thus, the positional displacement between the TFT substrate 100 and the counter substrate 200 can be more effectively prevented.

Eighth Embodiment

An eighth embodiment of the present invention will be described. In the above embodiments, the configuration is described in which in the IPS mode, the pixel electrode 112 is present on the upper side of the common electrode 110. The IPS mode also includes another mode in which the pixel electrode 112 is present on the lower side of (present on the TFT substrate side) and the common electrode 110 is present on the upper side (present on the liquid crystal layer side) through the capacitive insulating film 111. In this case, the common electrode 110 is formed flat entirely on the substrate, and a slit 1105 is formed on the common electrode 110 at the portion corresponding to the flat pixel electrode 112.

Figure 35:
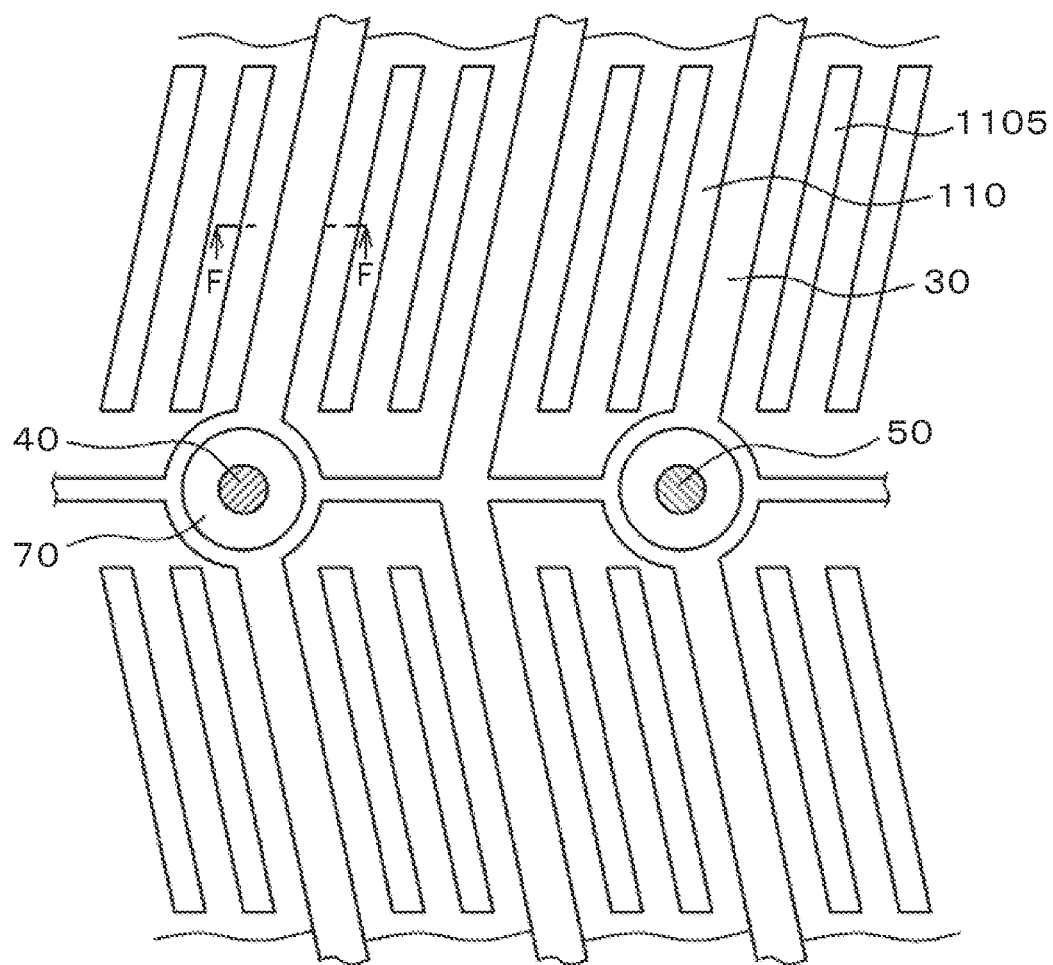
FIG. 35 is a plan view of an eighth embodiment.

FIG. 35 is a plan view of pixels in the case in which the common electrode 110 is present on the upper side. Similarly to FIG. 2, in FIG. 35, the common metal interconnection 30 is present to cover the picture signal line 20 and the scanning line 10. The pixel electrode 112 is present in the region surrounded by the picture signal line 20 and the scanning line 10. In FIG. 35, the pixel electrode 112 is omitted. The slit 1105 of the common electrode 110 is present corresponding to the pixel electrode 112. Through the slit 1105, electric flux lines extend in the liquid crystal to control liquid crystal molecules.

In FIG. 35, the through hole 70 is formed on the common metal interconnection 30 in the region in which the picture signal line 20 crosses the scanning line 10. In the through hole 70, the main columnar spacer 40 and the sub-columnar spacer 50 are disposed.

Figure 36:
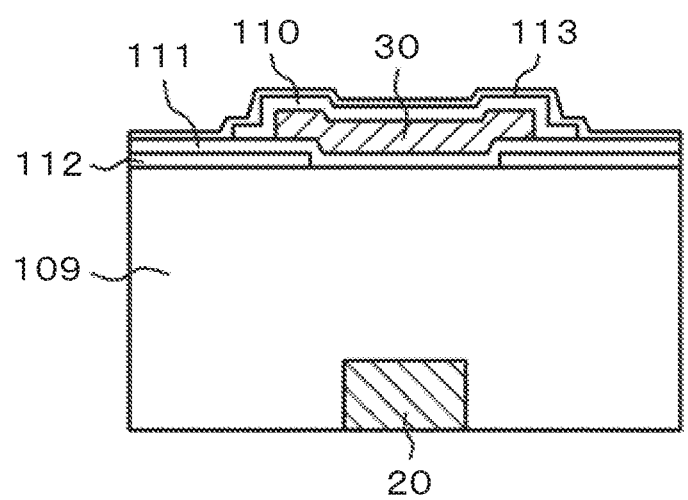
FIG. 36 is a cross sectional view taken along line F-F in FIG. 35.

FIG. 36 is a cross sectional view taken along line F-F in FIG. 35. In FIG. 36, the pixel electrode 112 is formed on the organic passivation film 109. The pixel electrode 112 is split between the pixels. In planar view, the picture signal line 20 is present between the pixel electrodes 112. The capacitive insulating film 111 is formed to cover the pixel electrode 112 and the organic passivation film 109.

On the capacitive insulating film 111, the common metal interconnection 30 is formed to cover the picture signal line 20. The common electrode 110 is formed to cover the common metal interconnection 30. On the cross section taken along line F-F, the slit 1105 is present on both sides of the common electrode 110. Consequently, the common electrode 110 looks like an island. However, as illustrated in FIG. 35, in the other regions, the common electrode 110 is formed widely in common among the pixels. Again referring to FIG. 36, the alignment film 113 is formed to cover the common electrode 110.

Similarly to the description in the first embodiment, also in this film configuration, in the through hole 70 of the common metal interconnection 30, the side wall of the through hole 70 is a barrier against the motion of the columnar spacer 40. The barrier prevents the columnar spacer 40 from moving. Consequently, the displacement between the TFT substrate 100 and the counter substrate 200 can be prevented.

In FIG. 36, the common metal interconnection 30 is formed on the lower side of the common electrode 110 (on the TFT substrate side). However, the common metal interconnection 30 may be formed on the upper side of the common electrode 110 (on the liquid crystal layer side). The configurations described in the first to seventh embodiments are applicable also in the eighth embodiment.

As described above, in the case in which the common electrode 110 is present on the upper side of the pixel electrode 112, the embodiment is applied to prevent the cut of the alignment film, the displacement between the TFT substrate 100 and the counter substrate 200, and light leakage caused by light reflected off the side surface of the picture signal line 20. Thus, the occurrence of bright spots caused by the cut of the alignment film can be prevented. The occurrence of color mixture, for example, caused by the displacement between the TFT substrate 100 and the counter substrate 200 can be prevented. A decrease in contrast caused by light reflected off the side surface of the picture signal line can be prevented.

In the description above, the case of the dielectric anisotropy of liquid crystal with a positive Δn, i.e., positive liquid crystal, is described. The above embodiments are also applicable to the dielectric anisotropy of liquid crystal with a negative Δn, i.e., negative liquid crystal. In this case, the alignment axis of the alignment film is at a right angle to the alignment axis 90 in FIG. 2.

In the description of the above embodiments, the common metal interconnection 30 is formed to cover the picture signal line 20 and the scanning line 10. However, the above embodiments are also applicable to the case in which the common metal interconnection 30 is formed to cover any one of the picture signal line 20 and the scanning line 10. The common metal interconnection 30 and the common electrode 110 are stacked between the organic passivation film 109 and the capacitive insulating film 111. However, a configuration may be possible in which an insulating film is provided between the common metal interconnection 30 and the common electrode 110 and electricity is conducted between them. In the structure in the first to seventh embodiments in which the pixel electrode is provided on the liquid crystal layer side, a configuration may be possible in which ITO on the same layer as the pixel electrode 112 is provided entirely in the inside of the through hole of the common metal interconnection 30 or provided in a region a predetermined distance apart from the pixel electrode 112. Thus, regions are provided in which the alignment film is not partially formed. Consequently, the effect of preventing the cut of the alignment film can be more enhanced.

What is claimed is:

1. A liquid crystal display device comprising:
   a TFT substrate including;
      an interlayer insulating film,
      an organic passivation film formed on the interlayer insulating film,
      a capacitive insulating film formed on the organic passivation film,
      a first alignment film formed on the capacitive insulating film,
      first to fourth source lines formed between the interlayer insulating film and the organic passivation film,
      a first transparent electrode formed between the organic passivation film and the capacitive insulating film,
      first to third metal lines formed between the organic passivation film and the capacitive insulating film, and
      a second transparent electrode between the capacitive insulating film and the first alignment film,
   a counter substrate including
      a spacer, and
      a second alignment film, and
   a liquid crystal between the first alignment film and the second alignment film,
   wherein, in a plan view,
   the second source line is located between the first source line and the third source line in a first direction,
   the third source line is located between the second source line and the fourth source line,
   a first contact hole of the organic passivation film is located between the first source line and the second source line,
   a second contact hole of the organic passivation film is located between the second source line and the third source line,
   a third contact hole of the organic passivation film is located between the third source line and the fourth source line,
   the first transparent electrode has a removed region between the first source line to the third source line,
   the removed region overlaps the second source line between the first contact hole and the second contact hole,
   the first contact hole and the second contact hole overlap the removed region,
   the removed region extends in the first direction from the first contact hole to the second contact hole across the second source line,
   the first metal line overlaps with the first source line,
   the second metal line overlaps with the second source line and extends across the removed region,
   the third metal line overlaps with the third source line, wherein
   the third metal line has a removed part that overlaps with the third source line, and is located between the second contact hole and the third contact hole in the first direction,
   the spacer overlaps with the removed part of the third metal line,
   a width of the third metal line is larger than a width of the third source line in the first direction,
   each of the first to third metal lines includes a bottom metal layer, a middle metal layer and a top metal layer,
   a width of the bottom metal layer is larger than a width of the middle metal layer, and
   a width of the top metal layer is smaller than the width of the middle metal layer.

2. The liquid crystal display device according to claim 1, wherein
   a second direction is a direction that intersects with the first direction,
   each of the first to third contact holes has a first end and a second end in the second direction,
   provided a first virtual line is a connecting line of the first ends of each of the first to third contact holes, a second virtual line is a connecting line of the second ends of each of the first to third contact holes,
   an end of the third metal line defines an edge of the removed part of the third metal line,
   a distance in the second direction between the end of the third metal line and the first virtual line is smaller than a distance in the second direction between the end of the third metal line and the second virtual line, and
   the distance in the second direction between the end of the third metal line and the first virtual line is bigger than zero.

3. The liquid crystal display device according to claim 2, wherein
   the second metal line is connected to the first transparent electrode.

4. The liquid crystal display device according to claim 1, wherein, in a cross sectional view,
   a first surface of the middle metal layer stacks on the bottom metal layer,
   the top metal layer stacks on a second surface of the middle metal layer, and
   both ends of the second surface are exposed from the top metal layer.

5. The liquid crystal display device according to claim 4, wherein, in the cross sectional view,
   both ends of the bottom metal layer are exposed from the first surface of the middle metal layer.

6. The liquid crystal display device according to claim 5, wherein, in the cross sectional view, a thickness of the bottom metal layer is thicker than a thickness of the top metal layer, and a thickness of the middle layer is thicker than the thickness of the bottom metal layer.

7. The liquid crystal display device according to claim 1, wherein the capacitive insulating film has a hole, and the hole overlaps the spacer.

8. The liquid crystal display device according to claim 7, wherein the hole of the capacitive insulating film exposes the first transparent electrode, the first alignment film exists in the hole, and the spacer is in contact with the first alignment film in the hole.

* * * * *